United States Patent
Tonoike et al.

(10) Patent No.: US 10,095,931 B2
(45) Date of Patent: Oct. 9, 2018

(54) STORE-ENTERING PERSON ATTRIBUTE EXTRACTION APPARATUS, STORE-ENTERING PERSON ATTRIBUTE EXTRACTION METHOD, AND NON-TRANSITORY COMPUTER READABLE MEDIUM

(71) Applicant: FUJI XEROX CO., LTD., Tokyo (JP)

(72) Inventors: Masatsugu Tonoike, Kanagawa (JP); Takeshi Onishi, Kanagawa (JP); Yusuke Uno, Kanagawa (JP); Daisuke Ikeda, Kanagawa (JP); Jun Shingu, Kanagawa (JP); Yusuke Yamaura, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 73 days.

(21) Appl. No.: 15/214,031

(22) Filed: Jul. 19, 2016

(65) Prior Publication Data

US 2017/0277957 A1    Sep. 28, 2017

(30) Foreign Application Priority Data

Mar. 25, 2016   (JP) ................... 2016-062498

(51) Int. Cl.
*G06K 9/00* (2006.01)
*G06F 17/30* (2006.01)
(Continued)

(52) U.S. Cl.
CPC ... *G06K 9/00771* (2013.01); *G06F 17/30259* (2013.01); *G06K 9/00228* (2013.01);
(Continued)

(58) Field of Classification Search
CPC .. G06K 9/00771; G06K 9/00228; G06K 9/46; G06K 9/00785; G06K 9/00369;
(Continued)

(56) References Cited

U.S. PATENT DOCUMENTS 7,006,672 B2 * 2/2006 Sato ............... G07C 9/00158
340/5.2
9,245,276 B2 * 1/2016 Golan ............. G06Q 30/0201
(Continued)

FOREIGN PATENT DOCUMENTS

JP    2008-286638 A    11/2008
JP    2009-015846 A    1/2009
(Continued)

OTHER PUBLICATIONS

Shihong et al.; "Facial Image Processing of which Practical Use Accelerates and Exemplary Applications Thereof;" Information Processing; vol. 50, No. 4; Apr. 2009; pp. 319-326.
(Continued)

*Primary Examiner* — Jose Couso
(74) *Attorney, Agent, or Firm* — Oliff PLC (57) ABSTRACT

A store-entering person attribute extraction apparatus includes a timing detector, an extraction unit, and an associating unit. The timing detector detects a boundary crossing timing for entering a store. The extraction unit extracts predetermined personal attributes from a captured store-entering person image acquired by capturing an image of a person entering the store. The associating unit associates the boundary crossing timing detected by the timing detector with the attributes extracted by the extraction unit.

17 Claims, 12 Drawing Sheets

(51) Int. Cl.
　　　G06K 9/46　　　(2006.01)
　　　G06Q 30/00　　(2012.01)
　　　G06T 7/20　　　(2017.01)
　　　H04N 7/18　　　(2006.01)
(52) U.S. Cl.
　　　CPC ............... *G06K 9/46* (2013.01); *G06Q 30/00* (2013.01); *G06T 7/2033* (2013.01); *G06T 7/2093* (2013.01); *H04N 7/181* (2013.01); *H04N 7/188* (2013.01); *G06T 2207/30196* (2013.01)
(58) Field of Classification Search
　　　CPC ........... G06K 9/00342; G06K 9/00362; G06K 9/00597; G06K 9/00221–9/00335; G06K 9/00348; G06K 2017/0045; G06K 9/00295; G06K 9/00778; G06F 17/30259; G06F 17/30793; G06Q 30/00; G06Q 30/02; G06Q 30/06; G06Q 50/00; G06Q 50/10; G06Q 30/0235; G06T 7/00; G06T 7/20; G06T 1/00; G06T 2207/30196; G06T 2207/30201; H04N 7/18–7/185; H04N 7/188; G06M 11/00; G07C 9/00; G07C 9/00079; G07C 9/00071; G07C 9/00087; G07C 9/000563; G07C 9/00904; G07C 9/00111; G07C 9/00103; G07C 9/00126; G08B 13/00; G08B 13/08; G08B 13/194; G08B 13/196; G08B 13/19602; G08B 13/19608; G08B 13/19613; G08B 13/19615; G08B 13/19671; G08B 13/19673; G08B 13/19697; G08B 13/2462; G08B 13/248; G08B 13/2491; G08B 21/22; G08B 25/001; G08B 25/008; G08B 25/009; G08G 1/005; H04W 12/08

See application file for complete search history.

(56) References Cited

U.S. PATENT DOCUMENTS

| | | | | |
|---|---|---|---|---|
| 9,305,363 | B2 * | 4/2016 | Marcheselli | G06K 9/00335 |
| 9,342,594 | B2 * | 5/2016 | Brown | G06F 17/30793 |
| 9,424,464 | B2 * | 8/2016 | Monta | G06K 9/00295 |
| 2007/0242860 | A1 * | 10/2007 | Hasebe | G06K 9/00255 |
| | | | | 382/118 |
| 2009/0268028 | A1 * | 10/2009 | Ikumi | G06K 9/00295 |
| | | | | 348/150 |
| 2014/0313330 | A1 * | 10/2014 | Carey | G06K 9/00771 |
| | | | | 348/143 |
| 2015/0199575 | A1 * | 7/2015 | Dudovich | G06K 9/00778 |
| | | | | 382/103 |
| 2016/0034751 | A1 * | 2/2016 | Brewer | G06K 9/00302 |
| | | | | 382/103 |
| 2016/0048721 | A1 * | 2/2016 | Harper | G06K 9/00771 |
| | | | | 382/103 |
| 2016/0104174 | A1 * | 4/2016 | Matsumoto | G06Q 30/0201 |
| | | | | 705/7.29 |
| 2016/0309096 | A1 * | 10/2016 | Hagisu | G06K 9/00342 |
| 2018/0075461 | A1 * | 3/2018 | Hirakawa | G06Q 30/0201 |
| 2018/0082111 | A1 * | 3/2018 | Golan | G06K 9/00281 |

FOREIGN PATENT DOCUMENTS

| | | |
|---|---|---|
| JP | 2010-015465 A | 1/2010 |
| JP | 2010-055594 A | 3/2010 |

OTHER PUBLICATIONS

Tsukamoto et al; "Face Region Tracking Method Used for Visual Agent;" Information Processing Society of Japan; The 46th National Convention; 1993; pp. 181-182.

* cited by examiner

| STORE ENTRY TIME | STORE ENTRY ID | CROSSING-BOUNDARY COORDINATE |
|---|---|---|
| ⋮ | ⋮ | ⋮ |
| 2015/3/25 19:20:30 | 3452 | 30 |
| 2015/3/25 19:20:31 | 3453 | 20 |
| 2015/3/25 19:20:32 | 3454 | 40 |

FIG. 4B

| PERSON ID | AGE | GENDER |
|---|---|---|
| ⋮ | ⋮ | ⋮ |
| 4523 | 23 | MALE |
| 4524 | 32 | FEMALE |
| 4525 | 54 | MALE |

FIG. 4C

| TIME | PERSON ID | x | y | WIDTH | HEIGHT |
|---|---|---|---|---|---|
| ⋮ | ⋮ | ⋮ | ⋮ | ⋮ | ⋮ |
| 2015/3/25 19:20:29 | 4523 | 25 | 170 | 30 | 30 |
| 2015/3/25 19:20:30 | 4524 | 18 | 150 | 40 | 40 |
| 2015/3/25 19:20:31 | 4525 | 18 | 120 | 50 | 50 |

STORE-ENTERING PERSON ATTRIBUTE EXTRACTION APPARATUS, STORE-ENTERING PERSON ATTRIBUTE EXTRACTION METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-062498 filed Mar. 25, 2016.

BACKGROUND

Technical Field

The present invention relates to a store-entering person attribute extraction apparatus, a store-entering person attribute extraction method, and a non-transitory computer readable medium.

SUMMARY

According to an aspect of the invention, there is provided a store-entering person attribute extraction apparatus including a timing detector, an extraction unit, and an associating unit. The timing detector detects a boundary crossing timing for entering a store. The extraction unit extracts predetermined personal attributes from a captured store-entering person image acquired by capturing an image of a person entering the store. The associating unit associates the boundary crossing timing detected by the timing detector with the attributes extracted by the extraction unit.

BRIEF DESCRIPTION OF THE DRAWINGS

An exemplary embodiment of the present invention will be described in detail based on the following figures, wherein.

DETAILED DESCRIPTION

Figure 1:
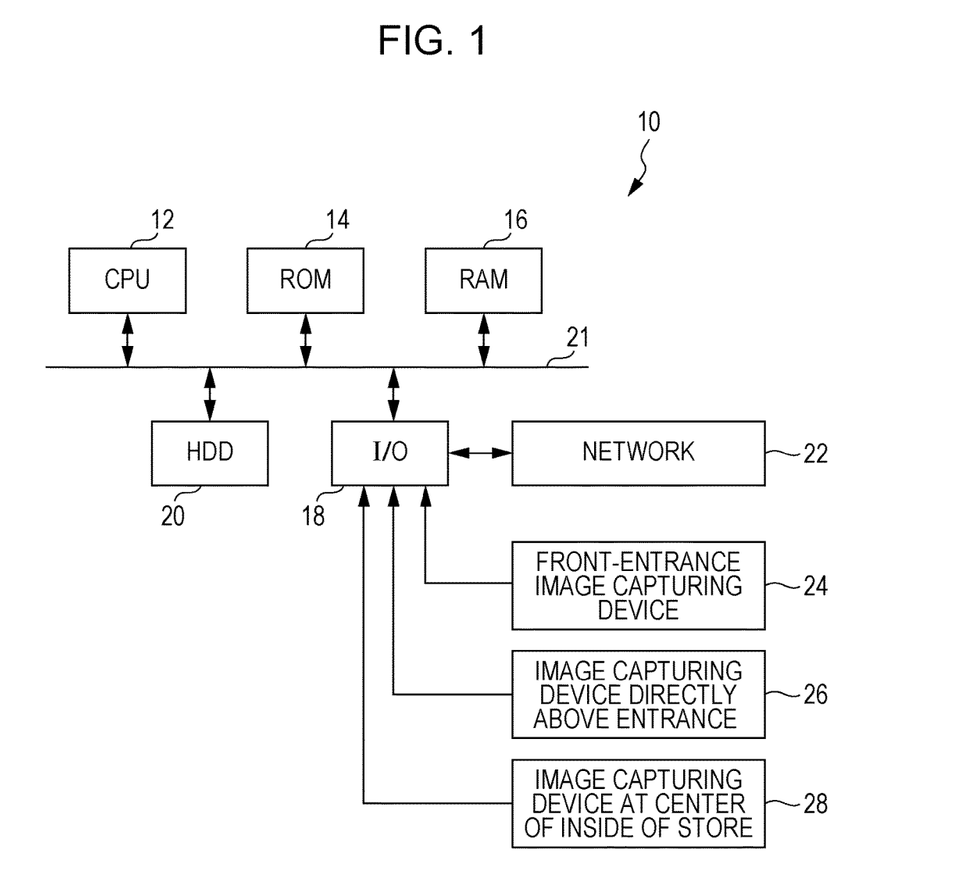
FIG. 1 is a diagram illustrating a schematic configuration of a store-entering person attribute extraction apparatus according to a present exemplary embodiment.

In the following, an example of a present exemplary embodiment will be described in detail with reference to the drawings. FIG. 1 is a diagram illustrating a schematic configuration of a store-entering person attribute extraction apparatus according to the present exemplary embodiment.

As illustrated in FIG. 1, a store-entering person attribute extraction apparatus 10 according to the present exemplary embodiment includes a computer in which a central processing unit (CPU) 12, a read-only memory (ROM) 14, a random-access memory (RAM) 16, and an input-output device (I/O) 18 are connected to a bus 21.

Furthermore, a storage device, such as a hard disk device (HDD) 20, is connected to the bus 21, and stores for example various types of data such as various databases.

The ROM 14 stores a store-entering person attribute extraction program, which will be described in detail later, for extracting attributes of a person entering the store, a program for detecting the path of a person entering the store, and the like, and the CPU 12 performs various processes by executing these programs.

In addition, a network 22 is connected to the I/O 18, and communication with other computers or other information processing apparatuses connected to the network 22 is possible.

In addition, a front-entrance image capturing device 24, an image capturing device directly above an entrance of the store 26 (hereinafter simply referred to as "directly-above-entrance image capturing device 26"), and an image capturing device at the center of the inside of the store (hereinafter simply referred to as "store-center image capturing device 28") are connected to the I/O 18. The store-entering person attribute extraction apparatus 10 acquires images captured by these image capturing devices, and for example extracts attributes and detects the path of a person entering the store. Note that the front-entrance image capturing device 24, the directly-above-entrance image capturing device 26, and the store-center image capturing device 28 may be connected to the store-entering person attribute extraction apparatus 10 via a network, and the store-entering person attribute extraction apparatus 10 may be able to acquire captured images via the network.

Note that the computer included in the store-entering person attribute extraction apparatus 10 is further equipped with an input device such as a keyboard and other peripheral devices.

Figure 2:
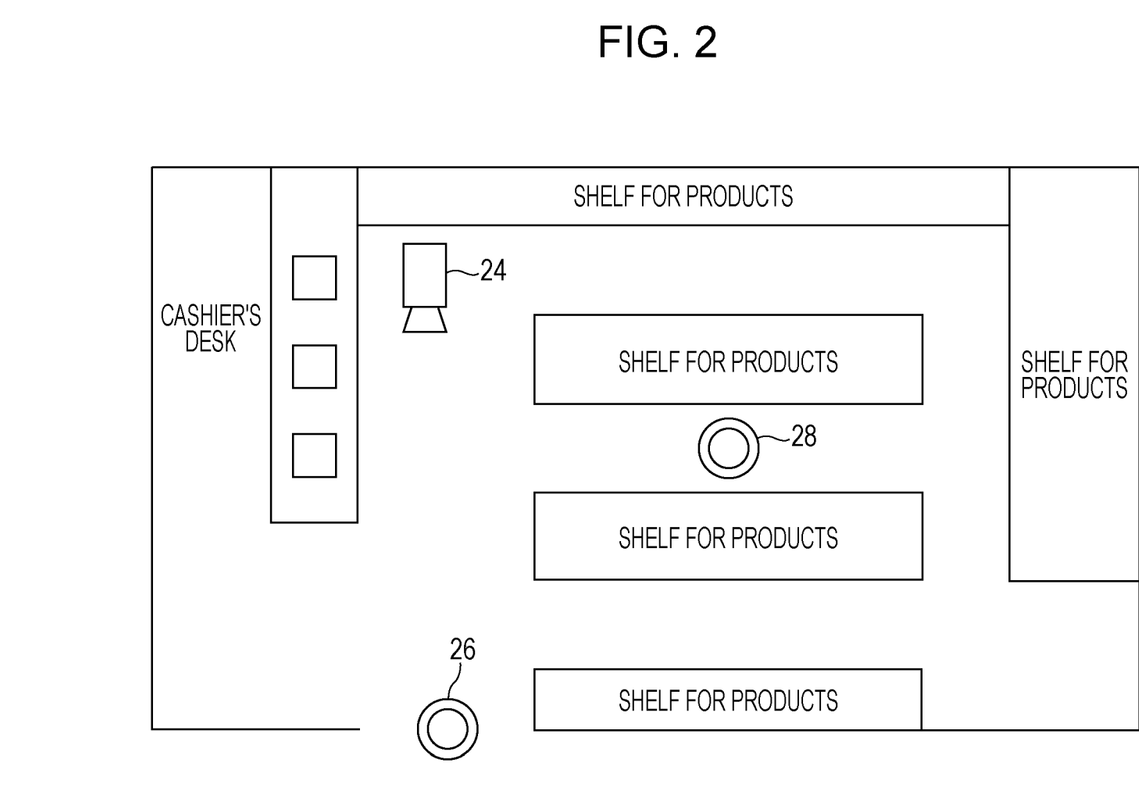
FIG. 2 is a diagram illustrating an example of arrangement, in a store, of a front-entrance image capturing device, an image capturing device directly above an entrance, and an image capturing device at the center of the inside of the store in the store-entering person attribute extraction apparatus.

FIG. 2 is a diagram illustrating an example of arrangement, in the store, of the front-entrance image capturing device 24, the directly-above-entrance image capturing device 26, and the store-center image capturing device 28 of the store-entering person attribute extraction apparatus 10. FIG. 2 illustrates an example of the layout of the store in which multiple shelves for products are provided inside the store and a cashier's desk is provided on the left side of the store when seen from the entrance.

The front-entrance image capturing device 24 is provided inside the store and at a position from which images of the front entrance may be captured. As illustrated in FIG. 2, the front-entrance image capturing device 24 captures images of the entrance of the store from the front and captures images including the faces of persons near the entrance of the store.

The directly-above-entrance image capturing device 26 is provided inside the store and directly above the entrance, captures images of persons crossing a boundary at the entrance, and is capable of detecting boundary crossing timings from the captured images.

The store-center image capturing device 28 is provided at a ceiling portion, for example, at the center of the store. The store-center image capturing device 28 captures, using for example an omnidirectional camera, images of an area including the front-entrance image capturing device 24 and the directly-above-entrance image capturing device 26.

Figure 3:
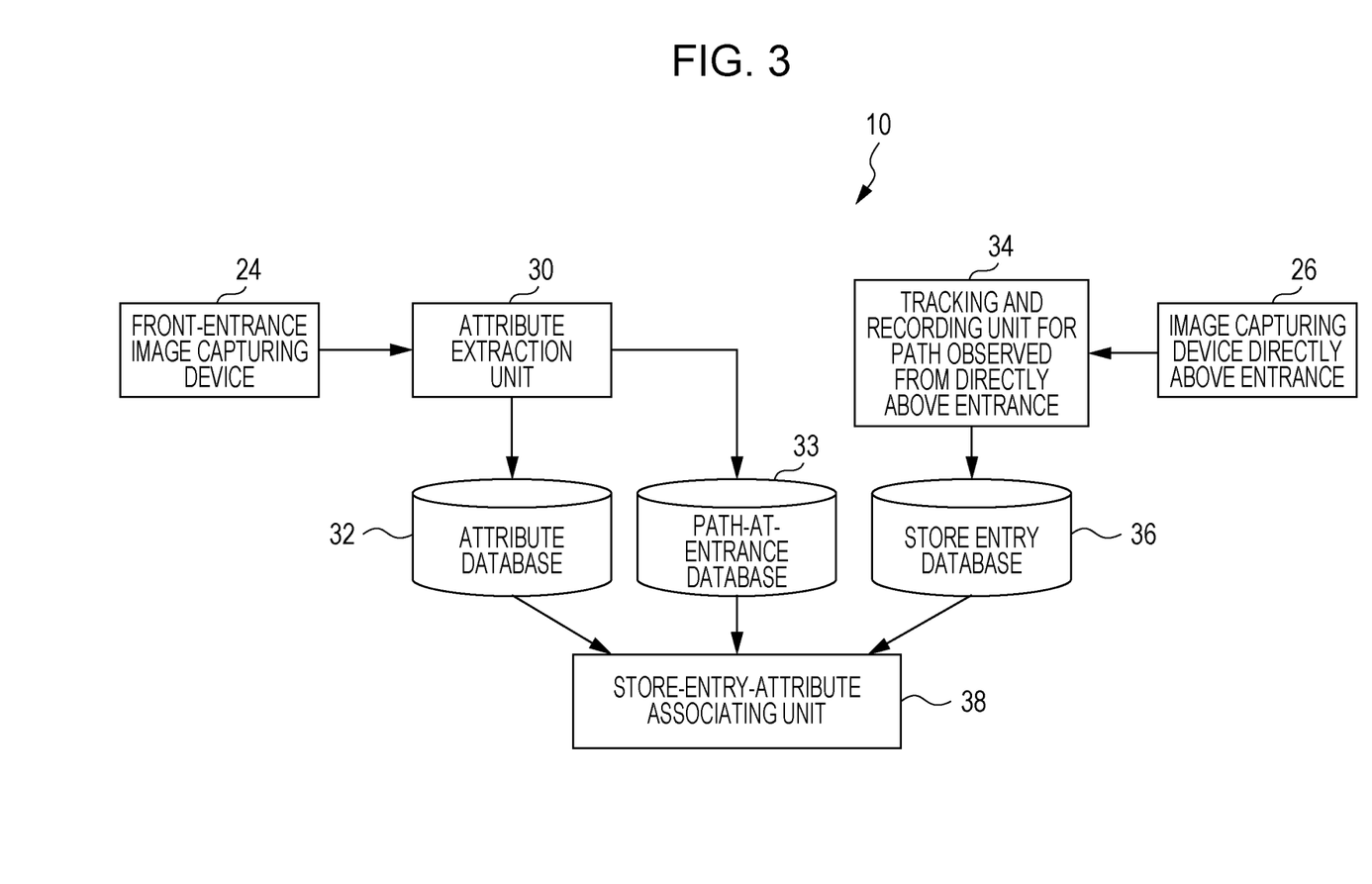
FIG. 3 is a functional block diagram illustrating functions executed by the store-entering person attribute extraction apparatus according to the present exemplary embodiment.

FIG. 3 is a functional block diagram illustrating functions executed by the store-entering person attribute extraction apparatus 10 according to the present exemplary embodiment.

The store-entering person attribute extraction apparatus 10 includes an attribute extraction unit 30 serving as an extraction unit, an attribute database 32, a path-at-entrance database 33, a tracking and recording unit 34 for a path observed from directly above the entrance (hereinafter referred to as "path-at-entrance tracking and recording unit 34") serving as a timing detector, a store entry database 36, and a store-entry-attribute associating unit 38 serving as an associating unit.

The attribute extraction unit 30 acquires an image captured by the front-entrance image capturing device 24, and extracts attributes of a person by extracting for example an image of the face of the person from the captured image. For example, the face of the person is recognized from the image captured by the front-entrance image capturing device 24, and an image of the face of the person is extracted from the captured image. Various attributes such as an age, a gender, the orientation of the face, and a hairstyle are then extracted from the extracted image of the face. Attributes may be extracted using a known technology by using pre-collected data stored in databases. For example, as an age-and-gender determination method, it is preferable that a discrimination circuit be built using Gabor as a feature value and using SVM from an image of a sample face as described in an analysis article (Lao Shihong; Yamaguchi Osamu. Facial Image Processing Technology for Real Applications: Recent Progress in Facial Image Processing Technology. Jouhou Shori 2009, 50(4), 319-326).

In addition, the attribute extraction unit 30 extracts the image of the face of the person from the captured image, assigns a person ID, tracks the path of the image of the face, and detects a coordinate path. For example, the attribute extraction unit 30 extracts a region of the image of the face (hereinafter also referred to as "face region") as a rectangular region, and detects reference coordinates of the rectangular region (for example the coordinates of a predetermined corner). In addition, the attribute extraction unit 30 also detects the width, height, and the like of the rectangular region of the image of the face.

Figure 4A:
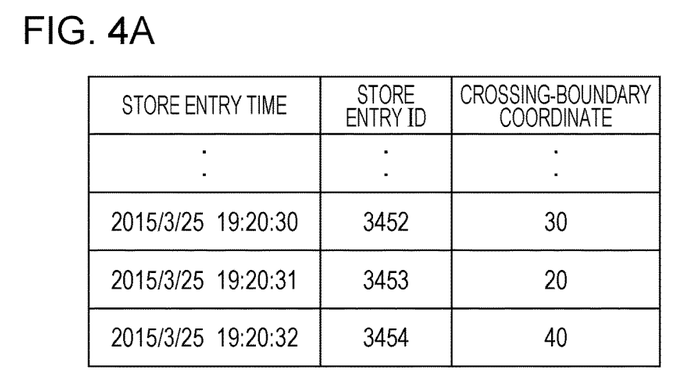
FIG. 4A is a diagram illustrating an example of a store entry database.
Figure 4B:
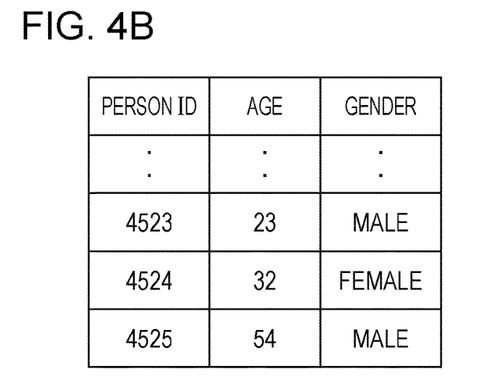
FIG. 4B is a diagram illustrating an example of an attribute database.

The attribute database 32 stores the attributes extracted by the attribute extraction unit 30 together with the person ID, the attribute database 32 being stored in a storage medium such as a HDD 20. As an example of the attribute database 32, attributes such as the extracted age, gender, and the like are stored on a person-ID basis as illustrated in FIG. 4B.

Figure 4C:
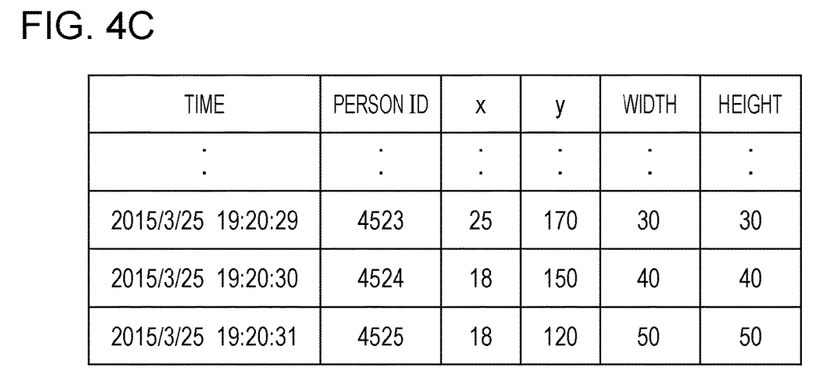
FIG. 4C is a diagram illustrating an example of an entrance path database.
Figure 5:
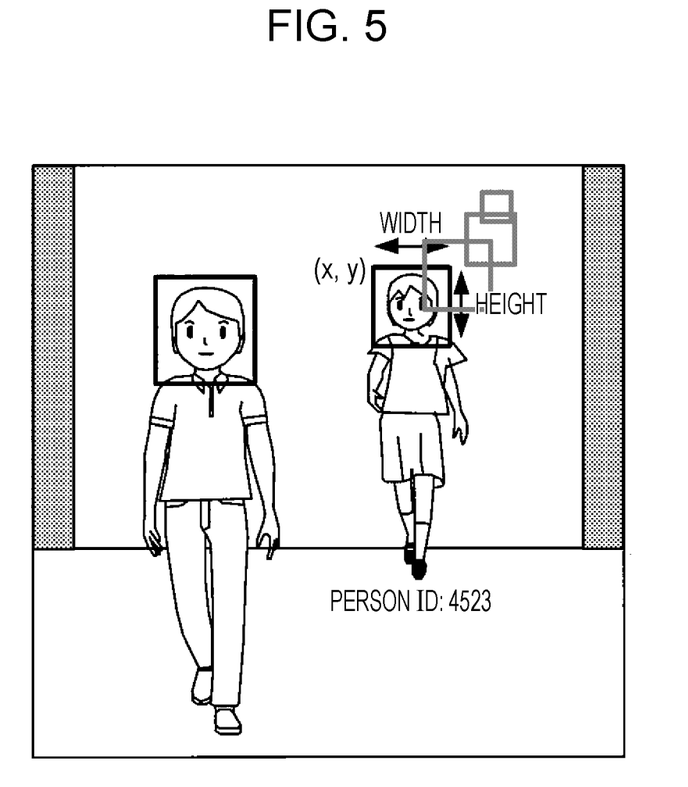
FIG. 5 is a diagram for describing tracking of coordinates of a face region.

The path-at-entrance database 33 stores the coordinate path of the image of the face detected by the attribute extraction unit 30 in association with the person ID. For example, as illustrated in FIG. 5, the coordinates of the face region are tracked with time after the face region is recognized. A tracking result is treated as path data, and the path data is recorded on a time basis and stored in the path-at-entrance database 33. The path data is for example the coordinates (x, y), width, height, and the like of the face region, and is stored together with a time and a person ID as illustrated in FIG. 4C. Note that as a specific method for detecting and tracking a face, for example, a method described in a document (Tsukamoto Akitoshi; Lee Chilwoo; Tsuji Saburo. Face Tracking Scheme for Visual-Agent System. 46th Jouhou Shori Gakkai Zenkoku Taikai Kouen Ronbunshuu 1993, 181-182) is preferably used.

The path-at-entrance tracking and recording unit 34 acquires an image captured by the directly-above-entrance image capturing device 26, detects a person from the captured image, assigns a store entry ID, and also detects a boundary crossing timing (store entry time) at the boundary between the inside and outside of the store and a crossing-boundary position (crossing-boundary coordinate) at the entrance.

The store entry database 36 stores a detection result acquired from the path-at-entrance tracking and recording unit 34 on a person-ID basis, the store entry database 36 being stored in a storage medium such as the HDD 20. For example, as illustrated in FIG. 4A, a store entry time, a store entry ID, and a crossing-boundary coordinate are stored in the store entry database 36.

Figure 6A:
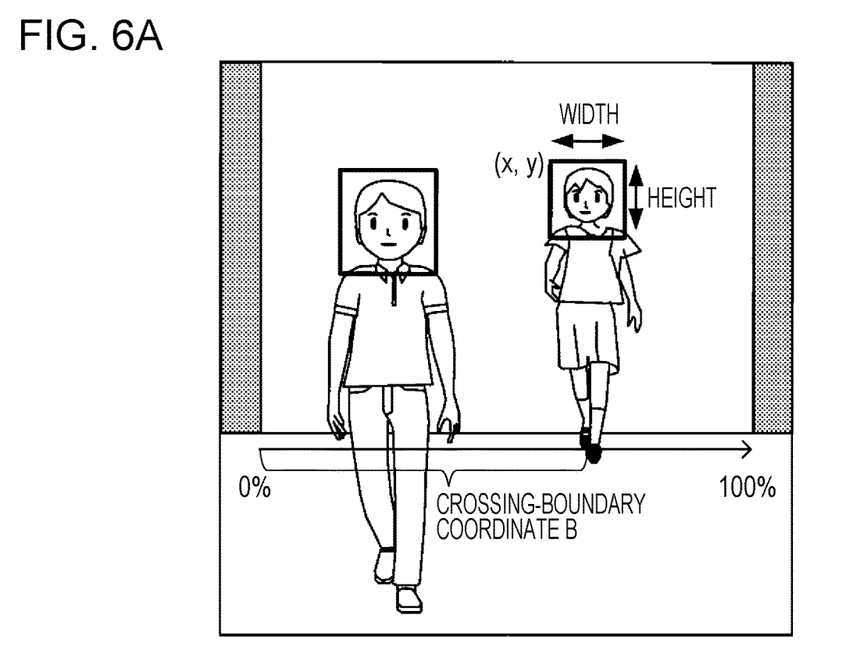
FIG. 6A is a diagram illustrating a crossing-boundary coordinate of an image captured by the front-entrance image capturing device.
Figure 6B:
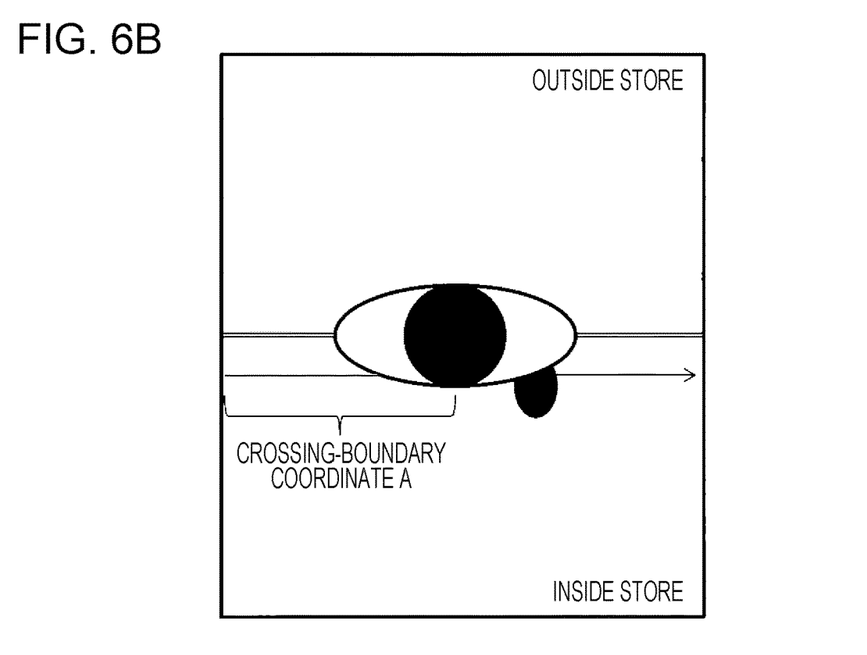
FIG. 6B is a diagram illustrating a crossing-boundary coordinate of an image captured by the image capturing device directly above the entrance.

The store-entry-attribute associating unit 38 generates and registers a store-entry-ID-person-ID associating database in which store entry IDs stored in the store entry database 36 are associated with person IDs stored in the attribute database 32. Here, the store-entry-attribute associating unit 38 reads out multiple pieces of path data associated with times near a certain store entry time from the path-at-entrance database 33, and a store entry ID and a person ID are associated with each other by performing filtering through elimination of path data including a coordinate significantly different from the crossing-boundary coordinate included in certain store entry data on the basis of the coordinates of the multiple pieces of path data. When filtering is performed, a coordinate value is converted into a proportion with respect to the width of the entrance so as to make it possible to compare coordinates between two captured images that are an image captured by the front-entrance image capturing device 24 and an image captured by the directly-above-entrance image capturing device 26. Filtering is performed by eliminating path data including boundary crossing positions that are significantly different from each other in the two images when comparison is made between the two images. For example, a crossing-boundary coordinate of an image captured by the front-entrance image capturing device 24 is denoted by B (FIG. 6A), and a crossing-boundary coordinate of an image captured by the directly-above-entrance image capturing device 26 is denoted by A (FIG. 6B). In this case, when (the crossing-boundary coordinate A–the crossing-boundary coordinate B)$^2$>a threshold a, it is determined that the crossing-boundary coordinate B is not associated with the crossing-boundary coordinate A, and the corresponding path data is eliminated. Note that the threshold a is a predetermined value.

Figure 7:
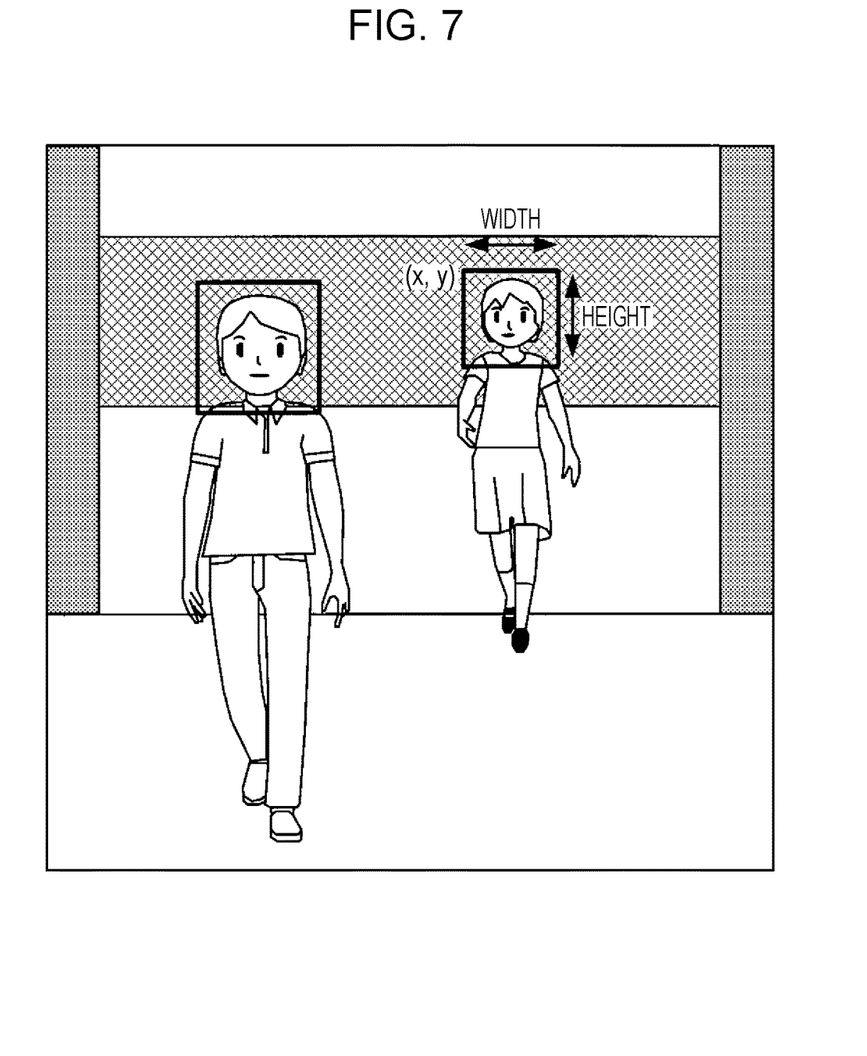
FIG. 7 is a diagram for describing a method for filtering out persons other than those observed from directly above the entrance.

In addition, as another way of filtering, filtering is performed by eliminating path data that does not correspond to a store entry ID on the basis of the position of an image of a face in a captured image. That is, when a person is on the boundary at the entrance, an image of the face of any person is detected in a predetermined range. Thus, for example, in the case where the region of an image of the face of a person is present outside a hatched region of FIG. 7, it is determined that the person is not on the boundary at the entrance and the corresponding path data is eliminated.

Furthermore, in the case where a person is on the boundary at the entrance, the width and height of the face also fall within certain ranges. Thus, in the case where at least one of the width and height of the face does not fall within a predetermined threshold range, it is also determined that the person is not on the boundary at the entrance and the corresponding path data is eliminated.

Figure 8A:
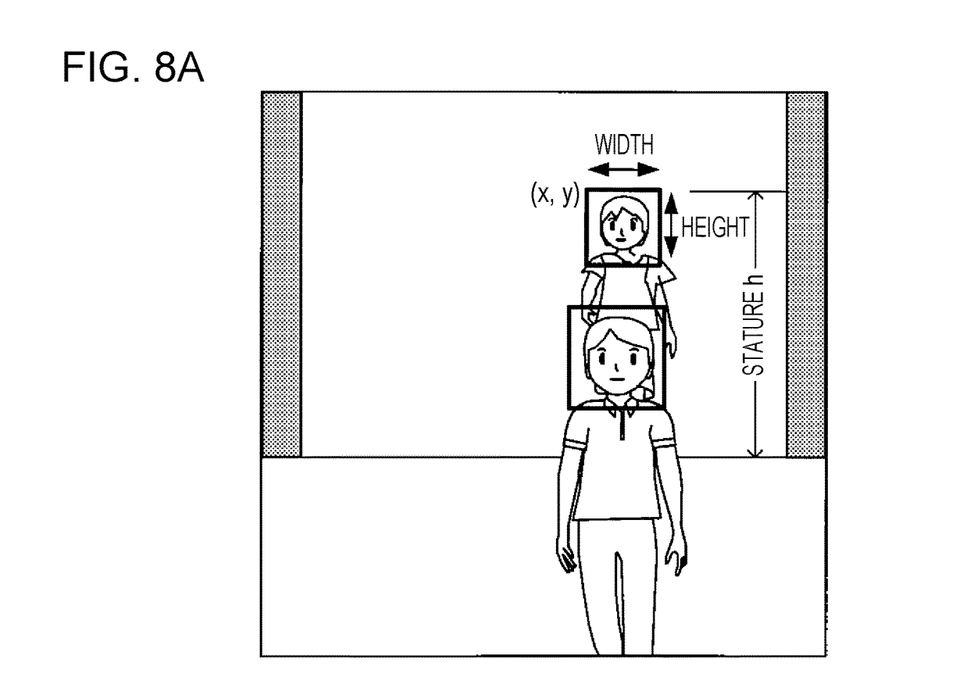
FIG. 8A is a diagram illustrating an example in which the stature of a person on the boundary at the entrance is extracted as an attribute.
Figure 8B:
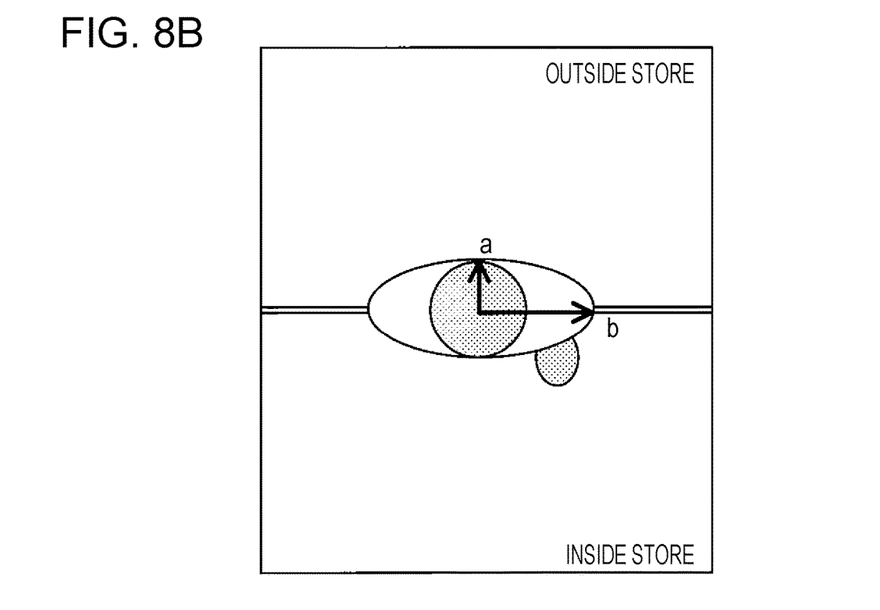
FIG. 8B is a diagram illustrating an example in which the area, weight, and circumference of a person on the boundary at the entrance as attributes.

Note that after the store-entry-attribute associating unit 38 has generated the store-entry-ID-person-ID associating database, attributes such as a stature, a weight, a body circumference may further be extracted and stored. For example, as illustrated in FIG. 8A, the attribute extraction unit 30 may detect, from an image captured by the front-entrance image capturing device 24, a stature h of a person who is on the boundary at the entrance at a boundary crossing timing. Since it may determine whether there is a person on the boundary at the entrance, the stature h may be detected from the number of pixels. In addition, as illustrated in FIG. 8B, a person is approximated as an oval figure and extracted from an image captured by the directly-above-entrance image capturing device 26, and his or her weight may be detected by generating an approximate expression for calculating the weight from the area (abπ) of the oval figure, which corresponds to the person. In addition, the body circumference may be obtained from an oval-figure circumference approximate expression described in the following.

$$L \approx \pi(a+b)\left(1 + \frac{3\left(\frac{a-b}{a+b}\right)^2}{10 + \sqrt{4 - 3\left(\frac{a-b}{a+b}\right)^2}}\right) \quad \text{[Math 1]}$$

Figure 9:
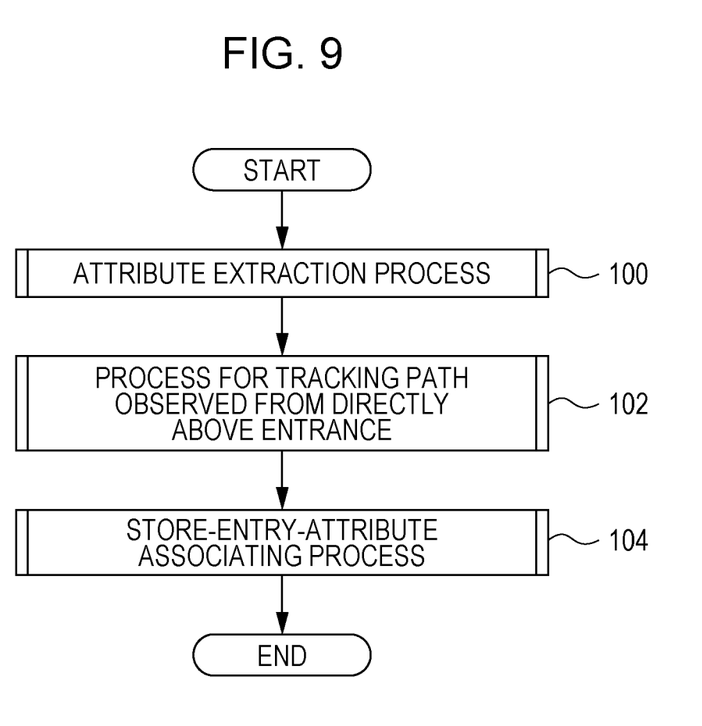
FIG. 9 is a flowchart illustrating a summary of a process performed by the store-entering person attribute extraction apparatus according to the present exemplary embodiment.

Next, specific details of a process performed by the store-entering person attribute extraction apparatus 10 configured as described above will be described. FIG. 9 is a flowchart illustrating a summary of the process performed by the store-entering person attribute extraction apparatus 10 according to the present exemplary embodiment. Note that the process of FIG. 9 is performed by the CPU 12 loading, into the RAM 16, and executing the store-entering person attribute extraction program stored in the ROM 14.

In step 100, the attribute extraction unit 30 performs an attribute extraction process, and the process proceeds to step 102. In the attribute extraction process, as described above, images captured by the front-entrance image capturing device 24 are acquired, an image of the face of a person is extracted from the captured images, attributes such as an age, a gender, the orientation of the face, and a hairstyle are extracted on a person basis, a person ID is assigned on a person basis, and the attributes are stored in association with the corresponding person ID in the attribute database 32 stored, for example, in the HDD 20. In addition, a coordinate path of the image of the face detected by the attribute extraction unit 30 is stored in association with the corresponding person ID in the path-at-entrance database 33.

In step 102, the path-at-entrance tracking and recording unit 34 performs a process for tracking a path observed from directly above the entrance, and the process proceeds to step 104. In the process for tracking a path observed from directly above the entrance, as described above, an image captured by the directly-above-entrance image capturing device 26 is acquired, the person is detected from the captured image, a store entry ID is assigned, and also a boundary crossing timing (store entry time) at the boundary between the inside and outside of the store and a crossing-boundary position (crossing-boundary coordinate) at the entrance are detected. A detection result acquired from the path-at-entrance tracking and recording unit 34 is then stored in the store entry database 36 stored, for example, in the HDD 20.

Figure 10:
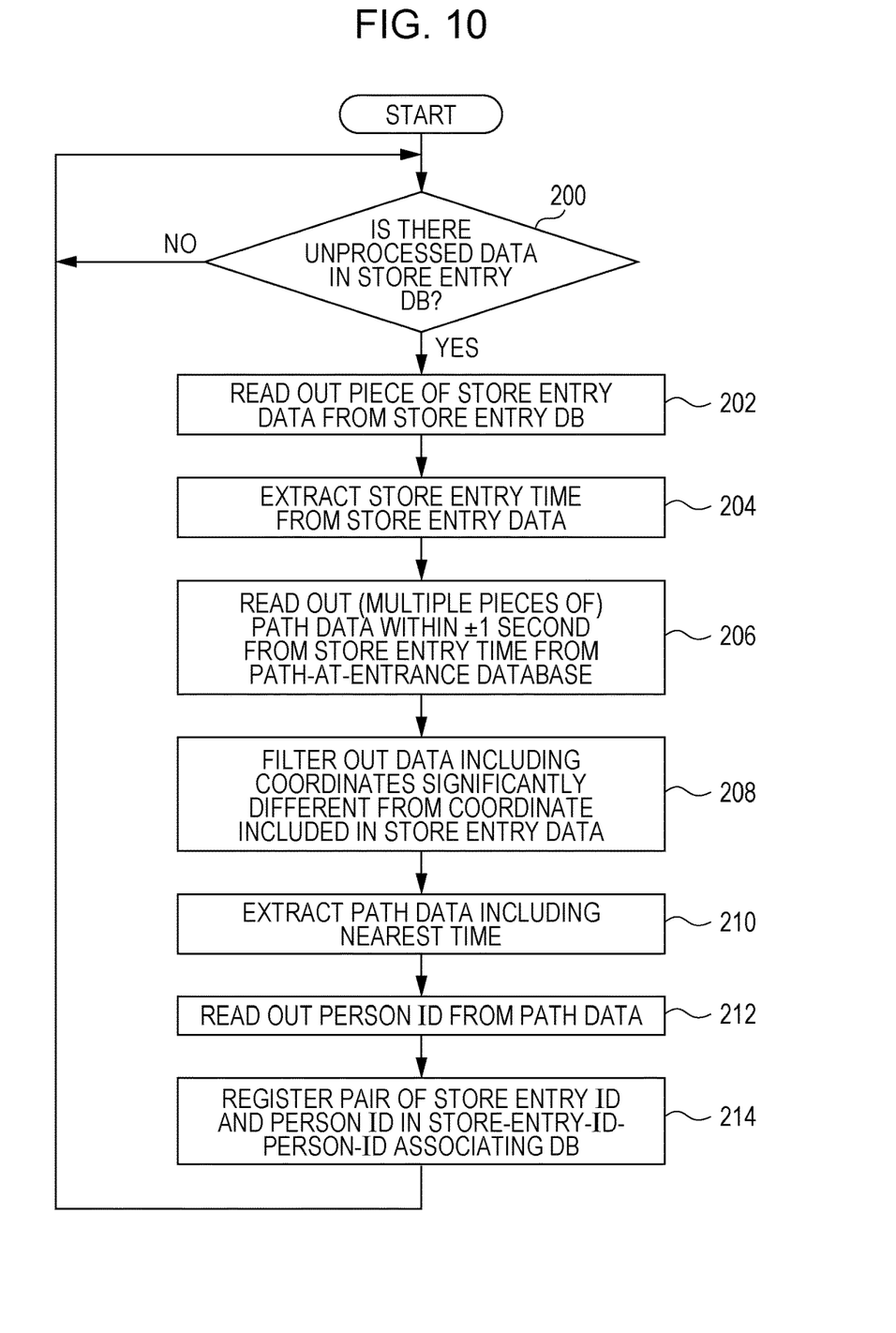
FIG. 10 is a flowchart illustrating an example of a store-entry-attribute associating process performed by a store-entry-attribute associating unit.

In step 104, the store-entry-attribute associating unit 38 performs a store-entry-attribute associating process, and a series of processes ends. Here, a specific example of the store-entry-attribute associating process will be described. FIG. 10 is a flowchart illustrating an example of the store-entry-attribute associating process performed by the store-entry-attribute associating unit 38.

In step 200, the store-entry-attribute associating unit 38 determines whether there is unprocessed data in the store entry database 36 (hereinafter referred to as store entry DB 36). Step 200 is repeatedly performed until Yes is obtained in step 200. When Yes is obtained in step 200, the process proceeds to step 202.

In step 202, the store-entry-attribute associating unit 38 reads out a piece of store entry data from the store entry DB 36, and the process proceeds to step 204.

In step 204, the store-entry-attribute associating unit 38 extracts the store entry time from the store entry data read out from the store entry DB 36, and the process proceeds to step 206.

In step 206, the store-entry-attribute associating unit 38 reads out, from the path-at-entrance database 33 (hereinafter referred to as path DB 33), multiple pieces of path data associated with times near (for example, ±1 second) the store entry time extracted in step 204, and the process proceeds to step 208.

In step 208, the store-entry-attribute associating unit 38 filters out, among the multiple pieces of path data, path data including coordinates significantly different from the crossing-boundary coordinate included in the store entry data, and the process proceeds to step 210. For example, a crossing-boundary coordinate of an image captured by the front-entrance image capturing device 24 is denoted by B (FIG. 6A), and a crossing-boundary coordinate of an image captured by the directly-above-entrance image capturing device 26 is denoted by A (FIG. 6B). In this case, when (the crossing-boundary coordinate A–the crossing-boundary coordinate B)$^2$>the threshold a, it is determined that the crossing-boundary coordinate B is not associated with the crossing-boundary coordinate A, and the corresponding path data is eliminated. In addition, for example, in the case where the region of an image of the face of a person is present outside the hatched region of FIG. 7, it is determined that the person is not on the boundary at the entrance and the corresponding path data does not correspond to the store entry data, and thus the corresponding path data is eliminated. In addition, in the case where the width and height of the face does not fall within predetermined threshold ranges, it is also determined that the person is not on the boundary at the entrance and the corresponding path data does not correspond to the store entry data, and thus the corresponding path data is eliminated.

In step 210, the store-entry-attribute associating unit 38 extracts, from the path data acquired as a result of the filtering performed in step 208, path data associated with a time nearest to the time included in the store entry data is acquired, and the process proceeds to step 212.

In step 212, the store-entry-attribute associating unit 38 reads out a person ID from the path data extracted in step 210, and the process proceeds to step 214.

Figure 12A:
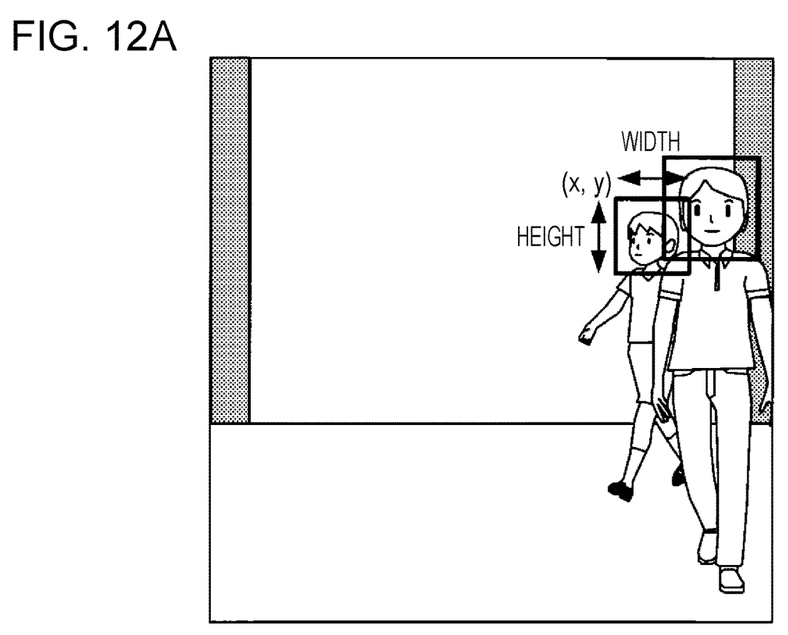
FIG. 12A is a diagram illustrating a case where a person who has already been in the store and has passed close by the entrance and another person overlap with each other.
Figure 12B:
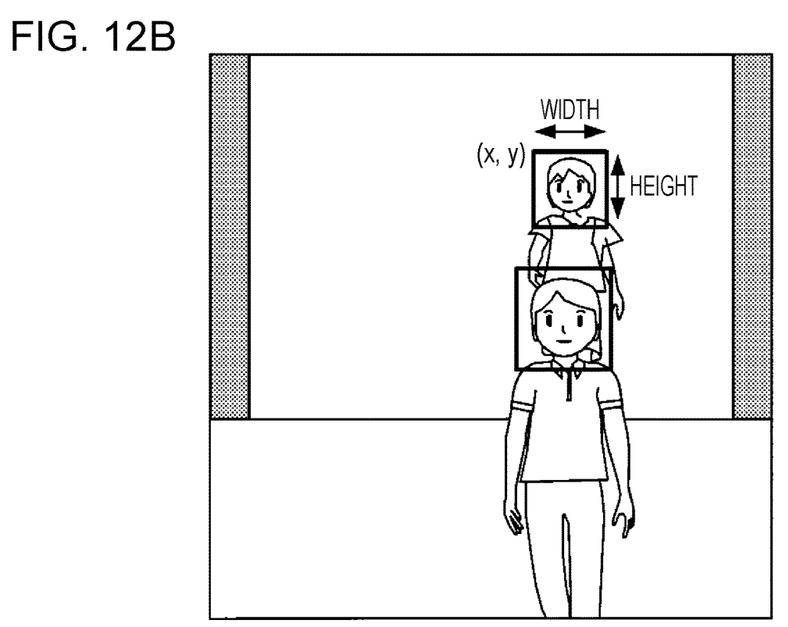
FIG. 12B is a diagram illustrating persons entering the store overlap with each other.

In step 214, the store-entry-attribute associating unit 38 registers a pair of the store entry ID and the person ID in the store-entry-ID-person-ID associating database (DB). The process returns to step 200, and the above-described process is repeated. As a result, since the store entry ID is associated with the person ID, a store entry timing corresponding to the store entry ID is associated with attribute data corresponding to the person ID. As a result, even when multiple persons overlap with each other in a captured image, a person who has already been in the store and has passed close by the entrance as the person closer to the entrance as in FIG. 12A, and a person entering the store as illustrated in FIG. 12B are certainly distinguished from each other, and the person entering the store is detected.

Figure 11:
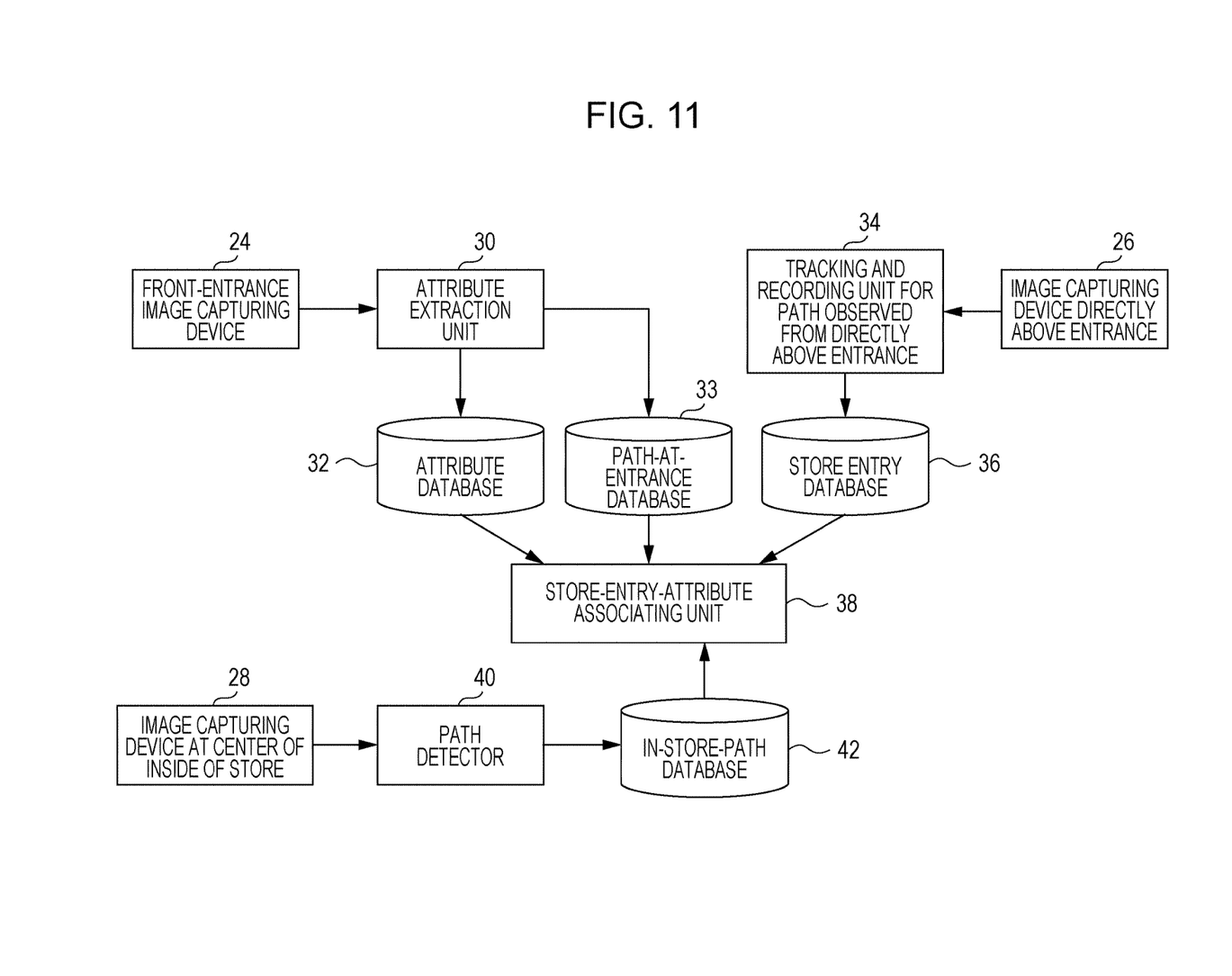
FIG. 11 is a functional block diagram of the store-entering person attribute extraction apparatus according to the present exemplary embodiment to which a configuration for further associating in-store-path information with attribute information.

Note that the store-entering person attribute extraction apparatus 10 according to the present exemplary embodiment may also be configured such that the path of a person who is in the store is further detected, and information regarding the path in the store is further associated with attribute information. FIG. 11 is a functional block diagram of the store-entering person attribute extraction apparatus 10 according to the present exemplary embodiment to which a configuration for further associating in-store-path information with attribute information.

That is, the above-described exemplary embodiment further includes a path detector 40 and an in-store-path database 42.

The path detector 40 acquires an image captured by the store-center image capturing device 28, extracts a person, assigns a person ID, and detects the path of the person in the store. For example, the path of the person in the store is detected, using a known technology by generating in-store-path information by projecting onto a plan view a tracking result acquired from an omnidirectional-image capturing device using for example a fish-eye lens. Note that when the path of the person is detected, attributes of the person may also be detected from the captured image at the same time.

The in-store-path database 42 stores, on a person-ID basis, the in-store-path information detected by the path detector 40.

By causing the store-entry-attribute associating unit 38 to further have the function of associating the in-store-path information with the store-entry-ID-person-ID associating database, the in-store-path information is associated with the attribute information. Since the store-center image capturing device 28 captures images of the area including the front-entrance image capturing device 24 and the directly-above-entrance image capturing device 26, the in-store-path information may be easily associated with the store-entry-ID-person-ID associating database similarly to as in the above-described store-entry-ID-person-ID association. For example, attention is paid to a time (store entry time) associated with in-store-path information acquired near the entrance, multiple store entry IDs associated with store entry times near the store entry time associated with the in-store-path information are read out from the store entry DB 36, and store entry IDs associated with crossing-boundary coordinates that are acquired at the time of store entry and that are significantly different from the crossing-boundary coordinate associated with the store entry are filtered out. The store entry ID associated with a time nearest to the store entry time is then associated with the in-store-path information.

Note that in the above-described exemplary embodiment, boundary crossing at the entrance is detected from an image-capturing result of the directly-above-entrance image capturing device 26 and the store entry DB 36 is generated; however, the way in which boundary crossing at the entrance is detected is not limited to this. For example, a boundary crossing timing may also be detected by detecting shielding of emitted laser light. In this case, the crossing-boundary position may be detected using multiple laser light beams or a Doppler laser.

In addition, the process performed by the store-entering person attribute extraction apparatus 10 according to the above-described exemplary embodiment may be stored as a program on a storage medium and be distributed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A store-entering person attribute extraction apparatus comprising:
   at least one camera positioned to capture images of a person entering a store; and
   a processor programmed to function as:
   a timing detector that detects a boundary crossing timing for the person entering the store;
   an extraction unit that extracts predetermined personal attributes from at least one of the captured images; and
   an associating unit that associates the boundary crossing timing detected by the timing detector with the attributes extracted by the extraction unit, wherein the associating unit acquires an attribute by eliminating, from the attributes extracted by the extraction unit, an attribute that does not correspond to the boundary crossing timing on the basis of a position of a face of the person in the captured store-entering person image, and associating the boundary crossing timing with the acquired attribute, to thereby improve the technology of monitoring attributes of people entering a store.

2. The store-entering person attribute extraction apparatus according to claim 1, wherein the timing detector detects the boundary crossing timing using a captured-from-directly-above image that is an image including the boundary and captured from directly above an entrance of the store.

3. The store-entering person attribute extraction apparatus according to claim 1, wherein the extraction unit extracts the attributes by tracking, using the captured store-entering person image, a path of the person.

4. The store-entering person attribute extraction apparatus according to claim 2, wherein the extraction unit extracts the attributes by tracking, using the captured store-entering person image, a path of the person.

5. The store-entering person attribute extraction apparatus according to claim 1, wherein the associating unit extracts the attributes from the captured store-entering person image, which is an image captured at the boundary crossing timing detected by the timing detector.

6. The store-entering person attribute extraction apparatus according to claim 2, wherein the associating unit extracts the attributes from the captured store-entering person image, which is an image captured at the boundary crossing timing detected by the timing detector.

7. The store-entering person attribute extraction apparatus according to claim 3, wherein the associating unit extracts the attributes from the captured store-entering person image, which is an image captured at the boundary crossing timing detected by the timing detector.

8. The store-entering person attribute extraction apparatus according to claim 4, wherein the associating unit extracts the attributes from the captured store-entering person image, which is an image captured at the boundary crossing timing detected by the timing detector.

9. The store-entering person attribute extraction apparatus according to claim 1, wherein the extraction unit extracts, from a captured-from-directly-above image that is an image including the boundary and captured from directly above an entrance of the store, another attribute that is different from the attributes.

10. The store-entering person attribute extraction apparatus according to claim 2, wherein the extraction unit extracts, from the captured-from-directly-above image that is the image including the boundary and captured from directly above the entrance of the store, another attribute that is different from the attributes.

11. The store-entering person attribute extraction apparatus according to claim 3, wherein the extraction unit extracts, from a captured-from-directly-above image that is an image including the boundary and captured from directly above an entrance of the store, another attribute that is different from the attributes.

12. The store-entering person attribute extraction apparatus according to claim 5, wherein the extraction unit extracts, from a captured-from-directly-above image that is an image including the boundary and captured from directly above an entrance of the store, another attribute that is different from the attributes.

13. The store-entering person attribute extraction apparatus according to claim 9, wherein the extraction unit extracts the other attribute using each of the captured store-entering person image and the captured-from-directly-above image.

14. The store-entering person attribute extraction apparatus according to claim 1, wherein the processor is further programmed to function as a path detector that detects a path by tracking the person in the store, and
wherein the associating unit further associates a detection result of the path detector with the boundary crossing timing and the attributes.

15. The store-entering person attribute extraction apparatus according to claim 2, further comprising a path detector that detects a path by tracking the person in the store,
wherein the associating unit further associates a detection result of the path detector with the boundary crossing timing and the attributes.

16. A store-entering person attribute extraction method comprising:
capturing images of a person entering a store using at least one capturing device;
detecting a boundary crossing timing for the person entering a store;
extracting predetermined personal attributes from at least one of the captured images; and
associating the detected boundary crossing timing with the extracted attributes by eliminating, from the attributes extracted by the extraction unit, an attribute that does not correspond to the boundary crossing timing on the basis of a position of a face of the person in the captured store-entering person image, and associating the boundary crossing timing with the acquired attribute, to thereby improve the technology of monitoring attributes of people entering a store.

17. A non-transitory computer readable medium storing a program causing a computer to execute a process, the process comprising:
capturing images of a person entering a store using at least one capturing device;
detecting a boundary crossing timing for the person entering the store;
extracting predetermined personal attributes from at least one of the captured images; and
associating the detected boundary crossing timing with the extracted attributes by eliminating, from the attributes extracted by the extraction unit, an attribute that does not correspond to the boundary crossing timing on the basis of a position of a face of the person in the captured store-entering person image, and associating the boundary crossing timing with the acquired attribute, to thereby improve the technology of monitoring attributes of people entering a store.

* * * * *